US012600284B2

(12) United States Patent
Komaromi

(10) Patent No.: US 12,600,284 B2
(45) Date of Patent: Apr. 14, 2026

(54) ROLLER BUNK APPARATUS AND SYSTEM FOR WATERCRAFT TRAILERS

(71) Applicant: EUROBOOST, INC., Sterling, VA (US)

(72) Inventor: Zoltan Komaromi, Sterling, VA (US)

(73) Assignee: Euroboost, Inc., Sterling, VA (US)

( * ) Notice: Subject to any disclaimer, the term of this patent is extended or adjusted under 35 U.S.C. 154(b) by 469 days.

(21) Appl. No.: 18/303,598

(22) Filed: Apr. 20, 2023

(65) Prior Publication Data
US 2024/0351508 A1 Oct. 24, 2024

(51) Int. Cl.
*B60P 3/10* (2006.01)
(52) U.S. Cl.
CPC .................................. *B60P 3/1066* (2013.01)
(58) Field of Classification Search
CPC ..................................................... B60P 3/1066
See application file for complete search history.

(56) References Cited

U.S. PATENT DOCUMENTS

| | | |
|---|---|---|
| 4,592,694 A | 6/1986 | Johnson |
| 4,893,828 A | 1/1990 | Godbersen |

OTHER PUBLICATIONS

Screen Captures from Youtube Videos uploaded by user etrailer. com. Video entitled "etrailer | All About the Boat Trailer Deluxe Roller Bunk", published by etrailer.com, 1 page, uploaded Dec. 19, 2015, respectively. (Year: 2015).*
Product link for DL21741 from Youtube Video by etrailer (Year: 2015).*
Product link for DL21741 from Youtube Video QnA section by etrailer (Year: 2015).*

* cited by examiner

*Primary Examiner* — Jason D Shanske
*Assistant Examiner* — Al-Birr Rahman Chowdhury
(74) *Attorney, Agent, or Firm* — Stanzione & Associates, PLLC; Patrick Stanzione

(57) ABSTRACT
An adjustable roller bunk apparatus and system for use with different size watercraft trailers. The roller bunk system can adjust to fit on all size trailers, can also adjust positioning to receive different angled hulls of watercrafts and prevents torque on the roller bunk system generally caused as a result of a force applied by weight of a watercraft on rollers attached to a roller bunk.

9 Claims, 7 Drawing Sheets

ROLLER BUNK APPARATUS AND SYSTEM FOR WATERCRAFT TRAILERS

STATEMENT REGARDING FEDERALLY SPONSORED RESEARCH OR DEVELOPMENT

Not applicable.

COPYRIGHT NOTICE

BACKGROUND OF THE INVENTIVE CONCEPT

1. Field of the Invention

The present inventive concept relates to an adjustable roller bunk apparatus and system for use with different size watercraft trailers. More particularly, but not exclusively, this inventive concept relates to an adjustable roller bunk apparatus and system for use with different size watercraft trailers which adjusts to all size trailers and eliminates torque caused as a result of the weight of a watercraft placed on rollers attached to the roller bunk system.

2. Description of the Related Art

In order to transport watercraft on land from one place to another and to place the watercraft into a body of water a trailer is commonly used. These trailers generally have a series of parallel bunks lined with carpet to secure and stabilize a watercraft on the trailer. The watercrafts are generally slid along these bunks until the watercraft is placed completely on the trailer and ready for transportation of the watercraft. Friction between the bunks and the hulls of the watercraft help keep the watercraft in place when backing down or pulling up from a ramp to the body of water. Rollers are commonly attached to the bunks to provide the ability to launch and retrieve a watercraft with respect to the trailer in any type conditions. When rollers are connected to the bunk it is important to keep the watercraft hooked to a winch line in order to control movement of the watercraft.

U.S. Pat. No. 4,893,828 by Godbersen discloses a boat trailer that uses a roller bunk apparatus having a pair of identical roller bunk units 22 each mounted on a side of a longitudinal axis of the trailer. Each of the roller bunk units 22 comprise an elongated tubular member 32 mounted by brackets 33 and fasteners 34 intermediate their ends to cross members 23 of the trailer. A plurality of roller units 49 are attached to the roller bunk units 22 via a respective arm 51 welded to an elongated tubular element 42,43 which nests on top of the elongated tubular member 32. Openings 36 are provided to attach the tubular element 42,43 to the elongated tubular member 32. With this configuration the bunk units 22 and rollers 49 are stationary on the trailer and cannot be adjusted for different size watercraft. Further, since the rollers units 49 are connected to the bunk units 22 by the respective U-shaped arms 51, when a heavy watercraft is placed on the rollers 49 a torque due to the weight of the watercraft is applied to the rollers 49 and arms 51 since there is no support under the rollers 49 to counter the force of the weight of the watercraft. Moreover, the rollers 49 do not adjust to the shape of a hull of the watercraft, and therefore the trailer with the bunk units 22 attached thereto can only receive a watercraft with a particular hull shape and length.

U.S. Pat. No. 4,592,694 by Johnson discloses a boat trailer 10 including a plurality of support members 43,43' and 86,86' that are mounted to respective cross bars 30 and 32. The mount members 43,43' and 86,86' must be bolted to the two cross bars 30 and 32, and therefore cannot be shifted forward or backward on the trailer to adjust for different size watercraft. In addition, this design requires a plurality of rollers 70 on each side of the mount members 43,43' and 86,86' in order to support a watercraft, where each of a plurality of pairs of rollers 70 must be provided on axles 65,66, which must be connected to a cross bar assembly 56 in a pivotal fashion to adjust to a hull of a watercraft. Accordingly, a significant number of rollers are required on a significant number of moving parts, including a plurality of rocker plates 55, a cross bar assembly 56, a plurality of spaced angle brackets 46, a plurality of axles 65,66, pivot bolts 67,68, etc.

Accordingly, there is a need for an adjustable roller bunk that can be attached to and unattached from any size trailer.

There is also a need for an adjustable roller bunk that can be adjusted forward and backward with respect to a trailer in order to balance any size watercraft on the trailer.

There is also a need for an adjustable roller bunk having a bracket that attaches to a trailer such that no torque is applied to rollers attached to the bunk.

SUMMARY OF THE INVENTIVE CONCEPT

The present general inventive concept provides an adjustable roller bunk system for use with different size watercraft trailers. More particularly, but not exclusively, this inventive concept relates to an adjustable roller bunk system for use with different size watercraft trailers which adjusts to all size trailers and eliminates torque caused as a result of the weight of a watercraft placed on rollers attached to the roller bunk system.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an adjustable roller bunk system for a watercraft trailer, comprising: a pair of roller bunks each including a plurality of roller axles extending from one side thereof; a roller rotatably disposed on each of the plurality of roller axles; at least two torque prevention brackets slidably attached at a top portion thereof and at a first half thereof to each roller bunk such that a second half of each torque prevention bracket extends outward from the roller bunk in a same direction as the roller axles, each of the at least two torque prevention brackets including: an attachment device to slidably attach the roller bunk to the top portion and first half thereof; an extension member disposed at the second half thereof and extending from a bottom portion thereof, the extension member including a hole extending through a middle portion to receive a bolt therethrough; and a bolt extending through the hole in the extension member and configured to attach the extension member to an attachment member on a watercraft trailer.

In an exemplary embodiment, the attachment device of each torque prevention bracket is a U-bolt configured to fit over the respective roller bunk and bolt to the first half of the torque prevention bracket.

In another exemplary embodiment, the extension members of each torque prevention bracket can be aligned along a same line as the plurality of roller axles extending from the one side of the corresponding roller bunk such that a force applied to the rollers of each roller bunk will cause an equal and opposite force on the extension members by the attachment members of the trailer in which the extension members are fixed thereto.

In another exemplary embodiment, the roller bunks and torque extension brackets can be formed of steel or aluminum.

In still another exemplary embodiment, the roller bunks and torque extension brackets can be formed of a polycarbonate or fiberglass material.

The foregoing and/or other features and utilities of the present general inventive concept may also be achieved by providing a roller bunk apparatus configured to be attached to a watercraft trailer, comprising: an elongated roller bunk including a plurality of roller axles extending from one side thereof; a roller rotatably disposed on each of the plurality of roller axles; at least two torque prevention brackets slidably attached at a top portion thereof and at a first half thereof to the roller bunk such that a second half of each torque prevention bracket extends outward from the roller bunk in a same direction as the plurality of roller axles, each of the at least two torque prevention brackets including: an attachment device to slidably attach the roller bunk to the top portion and first half thereof; and an extension member disposed at the second half thereof and extending from a bottom portion thereof, the extension member including a hole extending through a middle portion to attach to a bunk attachment member of a watercraft trailer, the second half of the torque prevention bracket and corresponding extension member configured to be disposed in a same line as the plurality of roller axles such that the rollers and extension members along a same line in parallel with the elongated roller bunk.

In an exemplary embodiment, the attachment device of each torque prevention bracket is a U-bolt configured to fit over the respective roller bunk and bolt to the first half of the torque prevention bracket.

In another exemplary embodiment, the roller bunk and torque extension brackets are formed of steel or aluminum.

In another exemplary embodiment, the roller bunk and torque extension brackets are formed of a polycarbonate or fiberglass material.

BRIEF DESCRIPTION OF THE DRAWINGS

These and/or other features and utilities of the present inventive concept will become apparent and more readily appreciated from the following description of the embodiments, taken in conjunction with the accompanying drawings of which:

FIG. 3 illustrates a plan view of a roller bunk system according to an example embodiment of the present inventive concept;

FIG. 4A illustrates an exploded unassembled view of a roller and bunk according to the example embodiment of FIG. 3; and FIG. 4B illustrates an assembled view of a roller and a bunk according to the example embodiment of FIGS. 3 and 4A;

FIG. 6A illustrates a back sideways view of a torque elimination bracket of the roller bunk system according to the example embodiment of FIG. 3;

FIG. 6B illustrates a front sideways view of the torque elimination bracket illustrated in FIG. 6A.

Figures 1A, 1B:
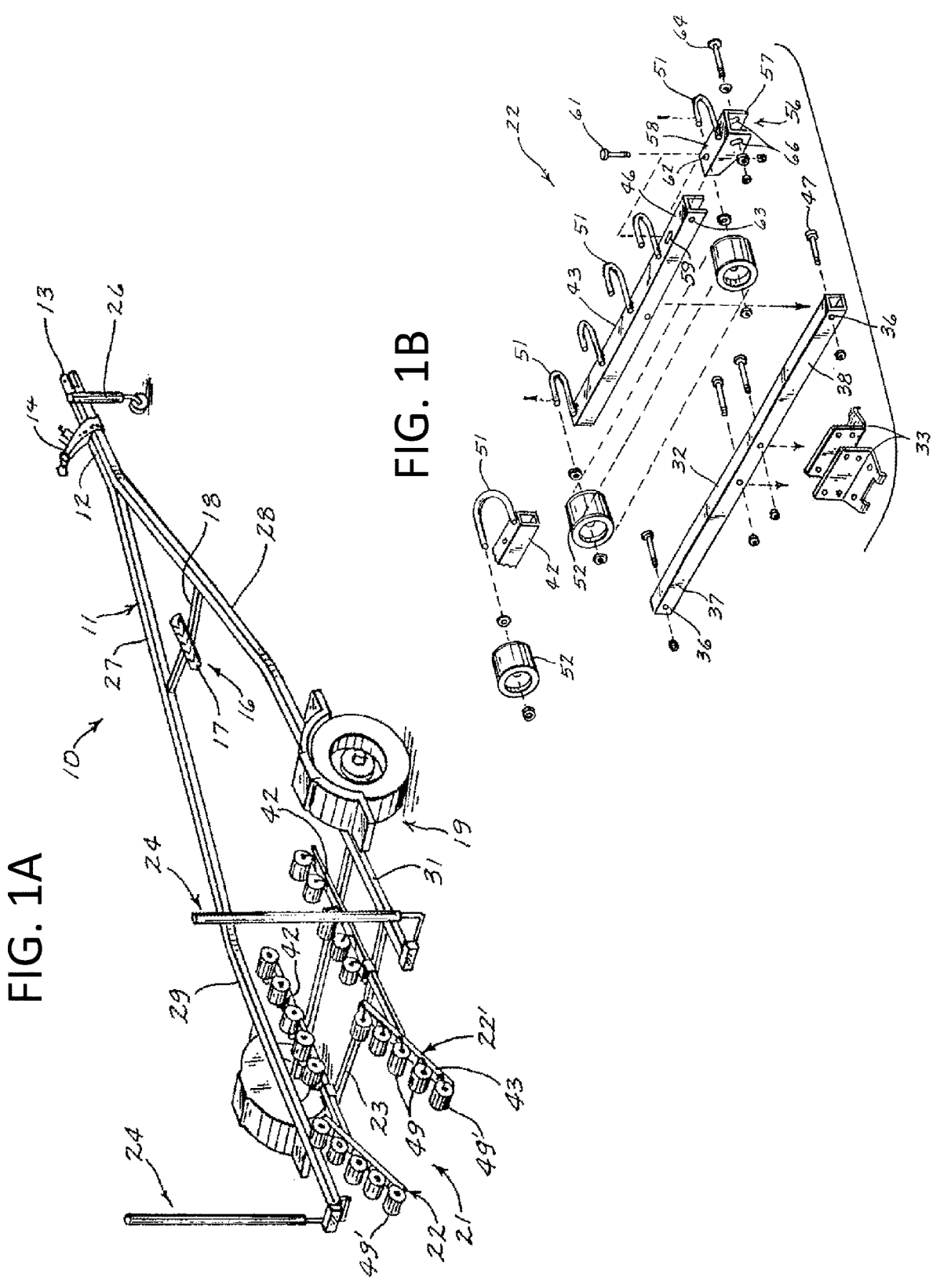
FIG. 1A illustrates a conventional trailer with roller bunks.
FIG. 1B illustrates a close-up view of a roller bunks according to the conventional trailer illustrated in FIG. 1A.
Figures 2A, 2B:
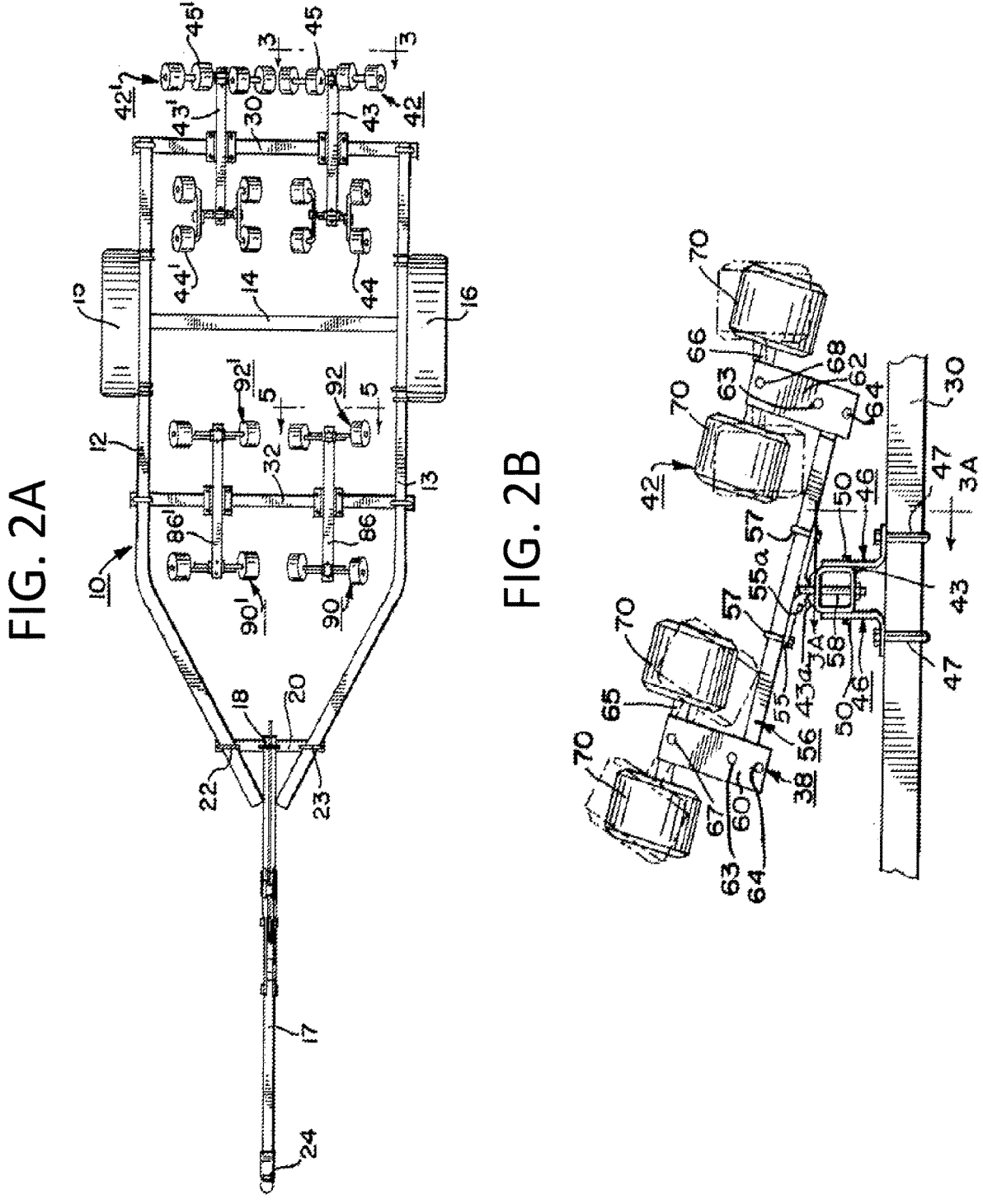
FIG. 2A illustrates a conventional trailer with roller assemblies.
FIG. 2B illustrates a close-up view of a roller assembly according to the conventional trailer illustrated in FIG. 2A.

The drawings illustrate a few exemplary embodiments of the present inventive concept, and are not to be considered limiting in its scope, as the overall inventive concept may admit to other equally effective embodiments. The elements and features shown in the drawings are to scale and attempt to clearly illustrate the principles of exemplary embodiments of the present inventive concept. In the drawings, reference numerals designate like or corresponding, but not necessarily identical, elements throughout the several views.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. Also, while describing the present general inventive concept, detailed descriptions about related well-known functions or configurations that may diminish the clarity of the points of the present general inventive concept are omitted.

It will be understood that although the terms "first" and "second" are used herein to describe various elements, these elements should not be limited by these terms. These terms are only used to distinguish one element from another element. Thus, a first element could be termed a second element, and similarly, a second element may be termed a first element without departing from the teachings of this disclosure.

Expressions such as "at least one of," when preceding a list of elements, modify the entire list of elements and do not modify the individual elements of the list.

All terms including descriptive or technical terms which are used herein should be construed as having meanings that are obvious to one of ordinary skill in the art. However, the terms may have different meanings according to an intention of one of ordinary skill in the art, case precedents, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Also, when a part "includes" or "comprises" an element, unless there is a particular description contrary thereto, the part can further include other elements, not excluding the other elements.

Hereinafter, one or more exemplary embodiments of the present general inventive concept will be described in detail with reference to accompanying drawings.

Exemplary embodiments of the present general inventive concept are directed to an adjustable roller bunk system 1000 for use with different size watercraft trailers. More particularly, but not exclusively, the present inventive concept relates to an adjustable roller bunk system 1000 for use with different size watercraft trailers which adjusts to all size trailers and eliminates torque caused as a result of the weight of a watercraft placed on rollers 1004 attached to bunks 1002 of the roller bunk system 1000.

Figure 3:
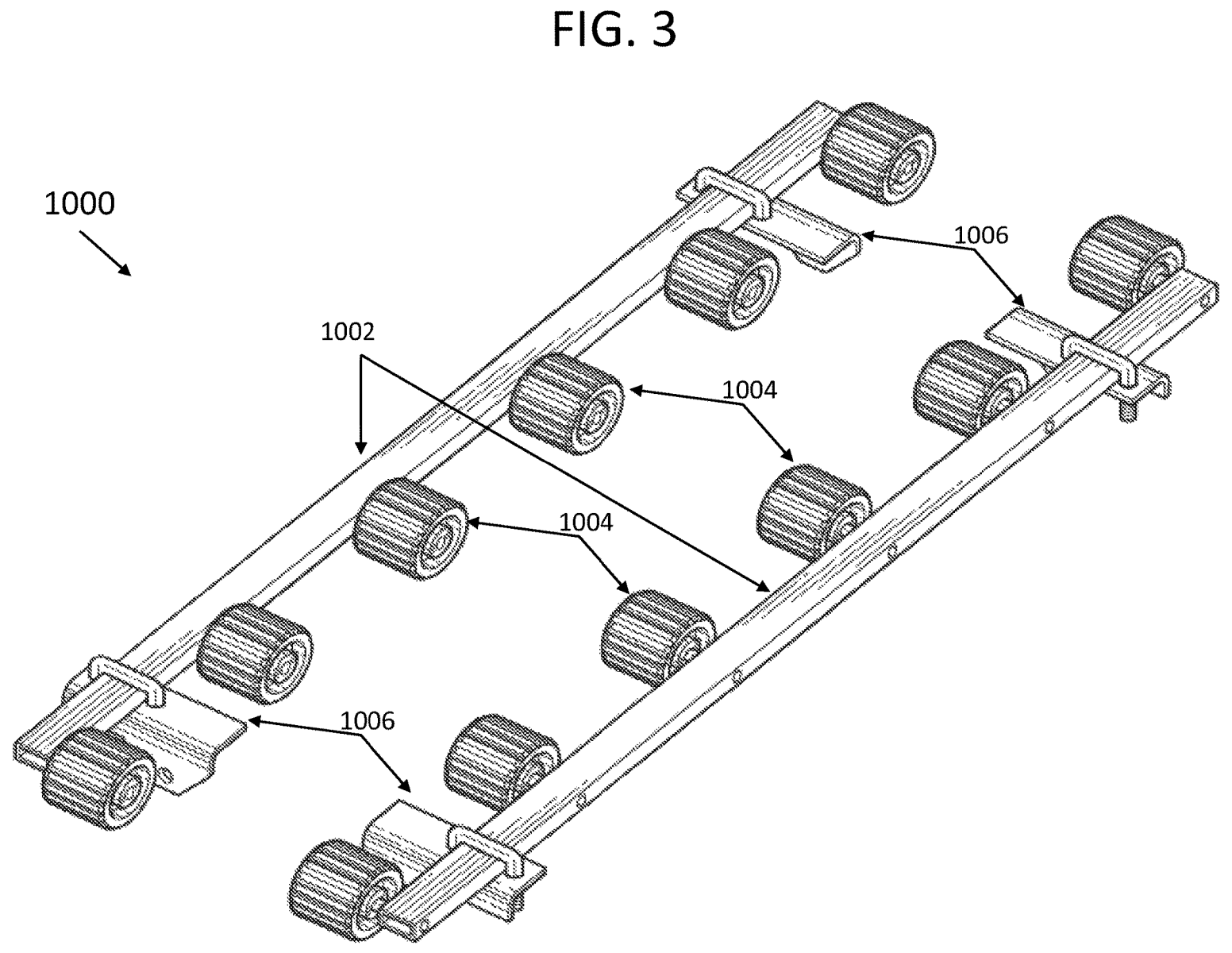

FIG. 3 illustrates a roller bunk system 1000 according to an example embodiment of the present inventive concept. The roller bunk system 1000 can include a pair of elongated roller bunks 1002 that attach to any size and shape watercraft trailer used to transport watercraft on land, to place a watercraft in water and to remove a watercraft from water. The roller bunks 1002 can be formed of a metal material, such as steel, aluminum, or a rigid polycarbonate or fiberglass material. However, the roller bunks 1002 can alternatively be formed of any type of material that will withstand the weight of a watercraft while being sufficiently rigid to absorb bumps that a trailer in which the roller bump system 1000 is attached to encounter. The roller bunks 1002 can have a length which corresponds with a length of a hull of a watercraft in order to completely accommodate the corresponding watercraft thereon.

The roller bunks 1002 can include a plurality of rollers 1004 connected along a length of each roller bunk 1002. The rollers 1004 are preferably equally spaced apart from each other along each roller bunk 1002. The rollers 1004 can be formed of a hard rubber material which will flex sufficiently to easily allow a watercraft to roll along the rollers 1004. Alternatively, the rollers 1004 can be formed of any material that will perform the intended purpose as described herein. The rollers 1004 can include an outer rubber material and an inner cylindrical metal portion to rotatingly attach to a roller bunk 1002. Alternatively, the rollers 1004 can be formed on one single rigid material that will withstand the weight of watercrafts placed thereon.

Figures 4A, 4B:
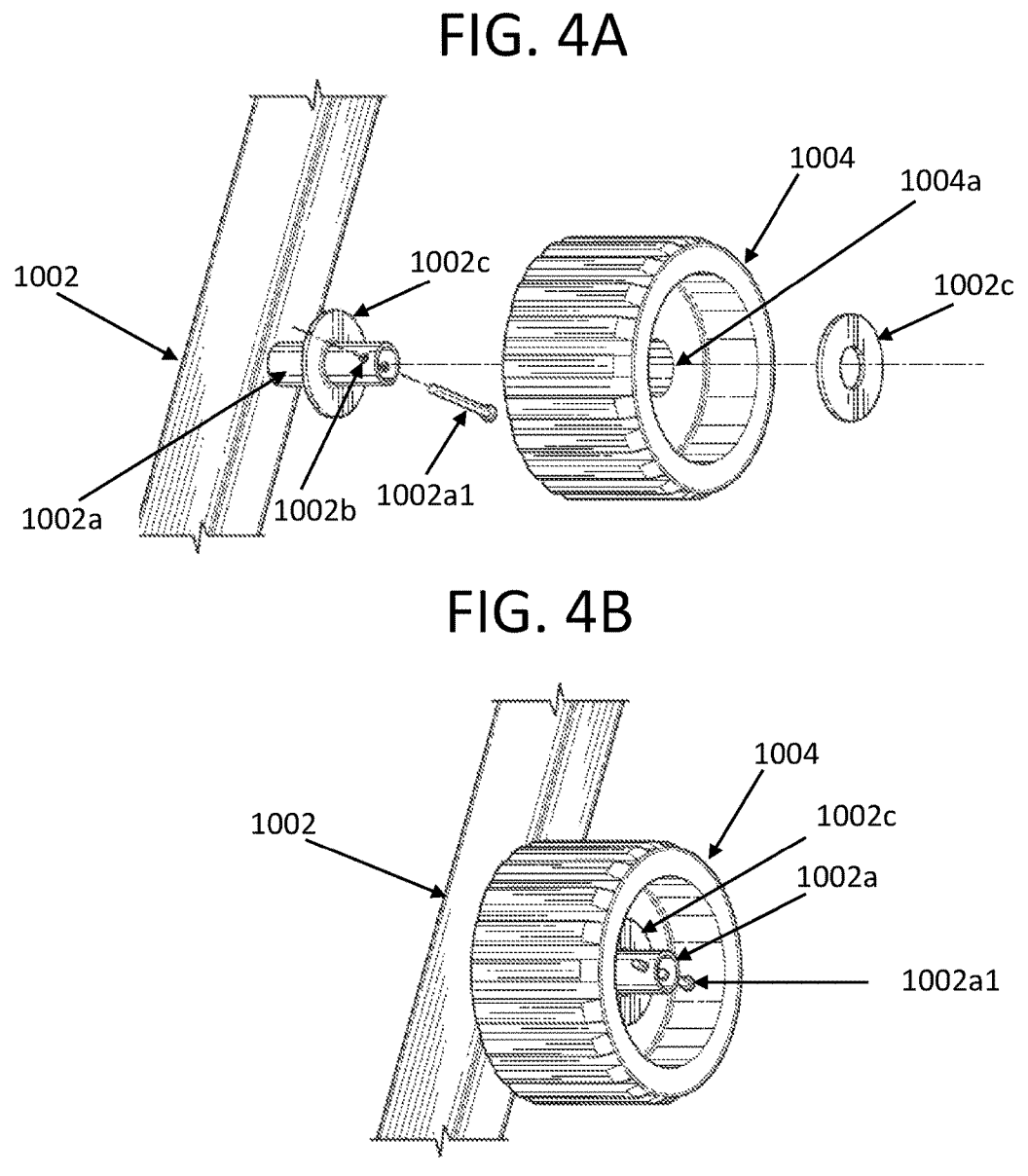

FIG. 4A illustrates an exploded unassembled view of a roller 1004 and bunk 1002 according to the example embodiment of FIG. 3; and FIG. 4B illustrates an assembled view of the roller 1004 and bunk 1002 according to the example embodiment of FIGS. 3 and 4A. As illustrated in FIG. 4A, the rollers 1004 can include a hole 1004a extending through a center thereof for connecting the rollers 1004 to the bunks 1002. More specifically, roller axles 1002a can be configured to extend from one side of each of the roller bunks 1002 to be inserted through a respective hole 1004a of a roller 1004 to receive a respective roller 1004 thereon. The roller axles 1002a can be welded at a first end thereof to the roller bunks 1002. Alternatively, the roller axles 1002a can be welded to an upper surface of the bunks 1002 or can be threaded through a center portion of the roller bunks 1002. Preferably the roller axles 1002a extend from a first side of a first roller bunk 1002 and a second side of the second roller bunk 1002 such that when the pair of roller bunks 1002 are aligned in parallel with each other the roller axles 1002a and respective rollers 1004 on the first roller bunk 1002 and the roller axles 1002a and respective rollers 1004 on the second roller bunk 1002 are facing each other. In other words, the roller axles 1002a on the first roller bunk 1002 and the roller axles 1002a on the second roller bunk 1002 will be pointing towards each other, as illustrated in FIG. 3.

Still referring to FIG. 4A, each roller axles 1002a can include a pin hole 1002b extending therethrough at a second end thereof to receive a pin 1002a1 therein. Once a roller 1004 is slid onto a respective roller axles 1002a the roller 1004 can be secured onto the respective roller axles 1002a by inserting a pin 1002a1 through the pin hole 1002b. In order to keep each roller 1004 in a stabile position on the respective roller axles 1002a a first washer 1002c can be secured onto the roller axles 1002a adjacent to the bunk 1002 to stop the roller 1004 at a predetermined position on the roller axles 1002a. The first washer 1002c is preferably secured at a position on the respective roller axle 1002a such that the entire roller 1004 is able to slide entirely onto the roller axle 1002a while allowing the pin hole 1002b to extend past the roller 1004. After the rollers 1004 are slid onto the respective roller axles 1002a a second washer 1002c can be slid onto each roller axle 1002a prior to inserting a pin 1002a1 through a respective pin hole 1002b. The first and second washers 1002c act to prevent the roller 1004 from moving back and forth along the roller axle 1002a and to keep the rollers 1004 at a fixed position on the roller axle 1002a. Alternatively, other equivalent means can be used to secure the rollers 1004 onto each respective roller axle 1002a.

As illustrated in FIG. 4B, each roller 1004 will be secured onto a respective roller axle 1002a once the roller 1004 disposed between the first and second washers 1002c and the pin 1002a1 is inserted through the respective pin hole 1002b. The pins 1002a1 can be provided in the form of a cotter pin such that the pin 1002a1 will not slide out of the respective pin hole 1002b. Alternatively, any type of pin can be used which will remain secured within the pin hole 1002b.

Figures 5A, 5B:
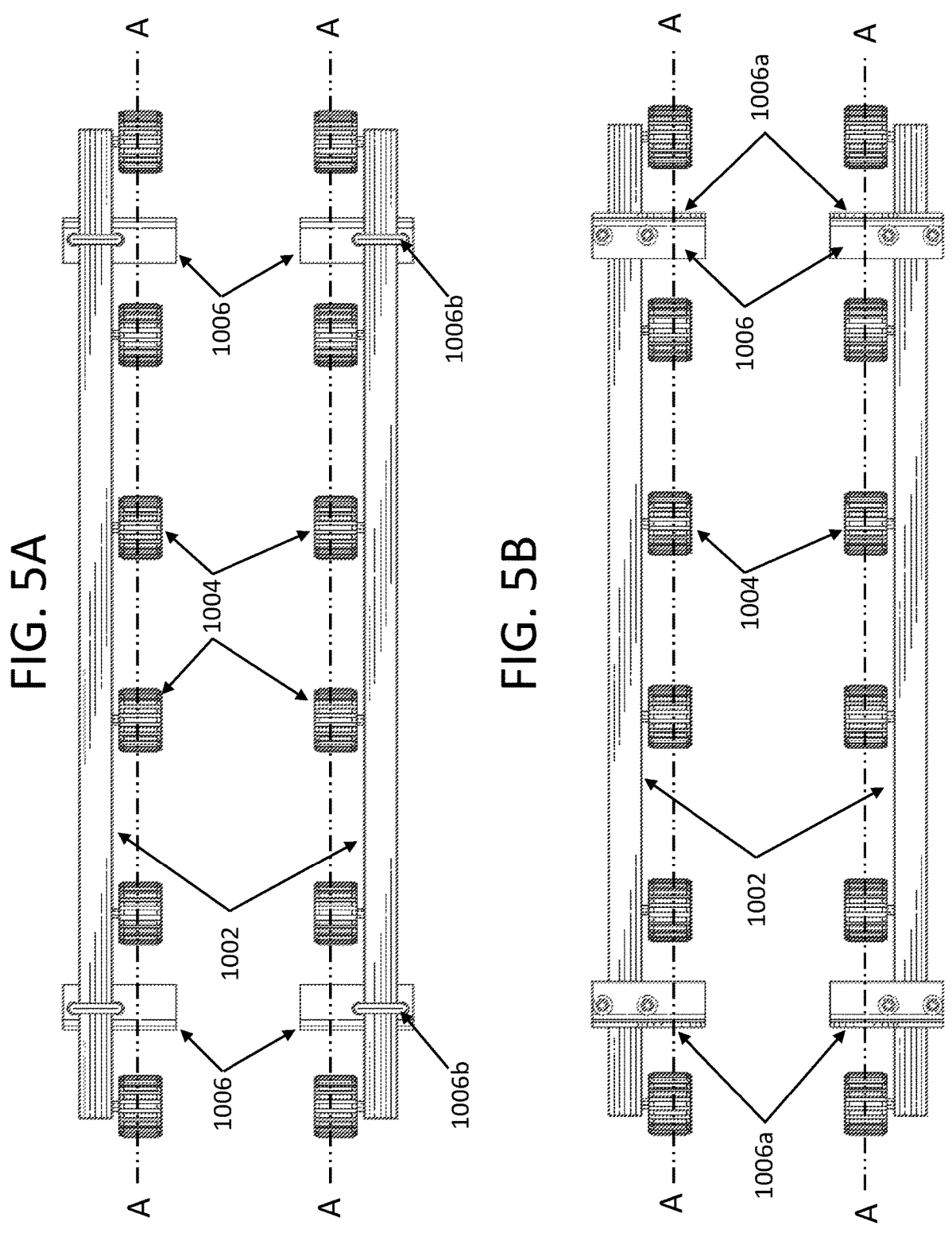
FIG. 5A illustrates a top view of the roller bunk system according to the example embodiment of FIG. 3.
FIG. 5B illustrates a bottom view of the roller bunk system according to the example embodiment of FIG. 3.

Referring to FIGS. 5A and 5B, at least two torque prevention brackets 1006 can be slidably attached to each roller bunk 1002. According to an example embodiment, a U-bolt 1006c can be used to attach each torque prevention bracket 1006 to a roller bunk 1002. The two or more torque prevention brackets 1006 can be slid to any desired position along each roller bunk 1002 in order to be moved into contact with a respective bunk attachment member 2002 (see FIG. 7) provided on a trailer (not illustrated). Since various different trailers have different lengths and widths, and therefore also have bunk attachment members 2002 disposed at different positions on a trailer based on the lengths and widths of the trailer, the torque prevention brackets 1006 attached to the roller bunks 1002 can be slid along the bunks 1002 via the U-bolts until each torque prevention bracket 1006 is brought into contact with a respective bunk attachment member 2002 on a trailer, at which point the torque prevention brackets 1006 can then be attached to the bunk attachment member 2002 with a bolt 1008 and nut 1008a combination (see FIG. 7).

Figures 6A, 6B:
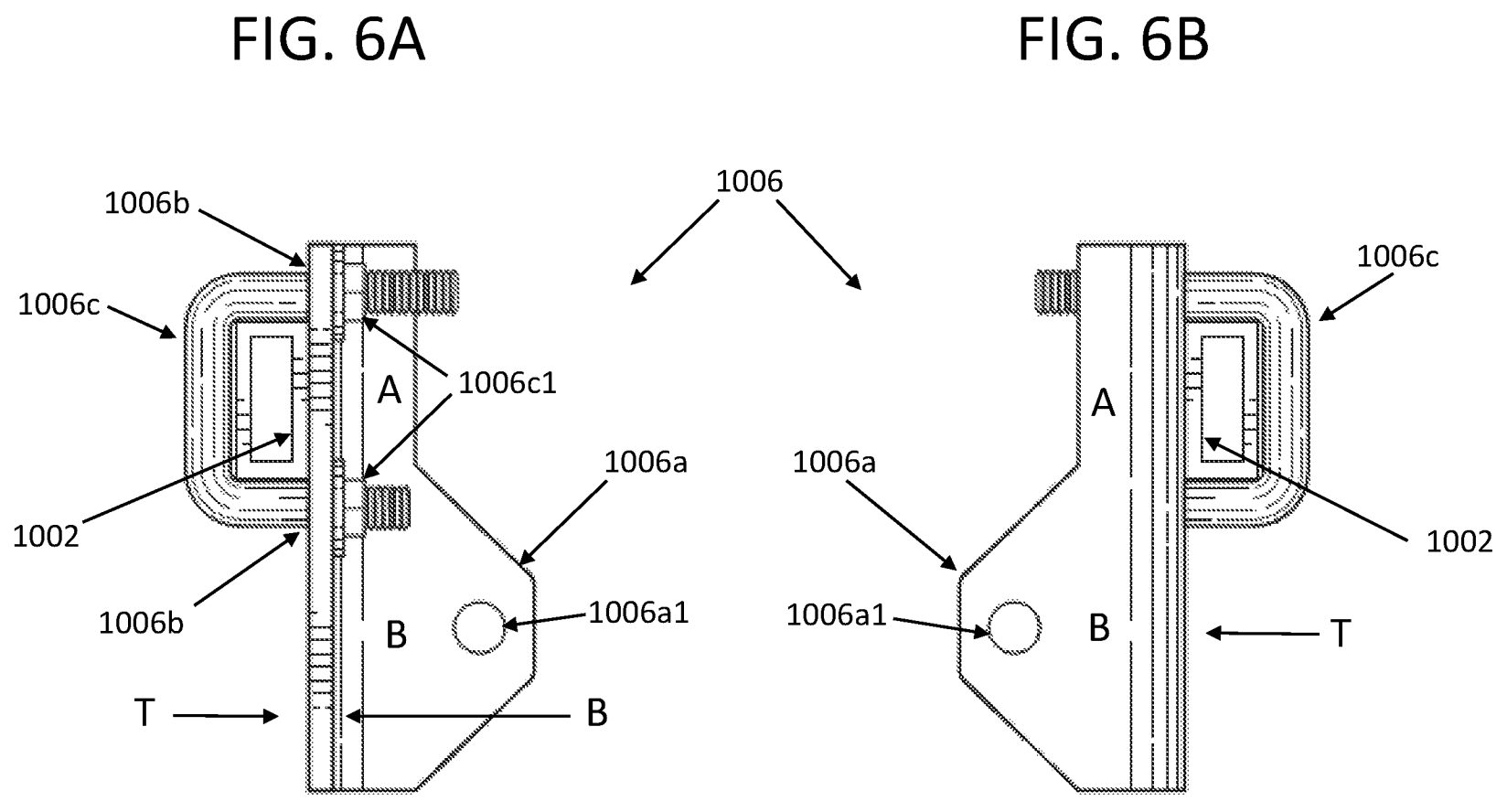

Referring to FIGS. 6A and 6B, each of the torque prevention brackets 1006 can be configured to include a pair of holes 1006b extending through a first half "A" thereof and a bracket extension member 1006a extending from a bottom portion B thereof at a second half "B" thereof. The extension members 1006a are configured to be attachable to a corresponding bunk attachment member 2002 (see FIG. 7) on a trailer by having a hole 1006*a*1 extending therethrough and a bolt 1008 (see FIG. 7) extending through the hole 1006*a*1, where a nut 1008*a* can be threaded onto the bolt 1008 to secure the torque prevention bracket 1006 to the respective bunk attachment member 2002. The torque prevention brackets 1006 can be tilted to any desired angle with respect to the bunk attachment member 2002 (and trailer) by rotating the torque prevention bracket 1006 about the bolt 1008. Once the roller bunks 1002 and rollers 1004 are tilted to the desired angle by tilting the torque prevention brackets 1006 in which the roller bunks 1002 are attached to, the torque prevention brackets 1006 can be secured in place by tightening the nuts 1008*a* onto the respective bolts 1008 to secure the torque prevention brackets 1006 in place. The purpose of tilting the roller bunks 1002 and corresponding rollers 1004 is to provide a flat surface with the rollers 1004 for the hull of an intended watercraft to rest on.

The torque prevention brackets 1006 can be formed of steel or aluminum, or a similar type of metal that will withstand the weight of a watercraft, and will withstand the jarring that occurs due to a trailer riding along a bumpy road at high speeds. As stated above, each bracket extension member 1006*a* can include a respective hole 1006*a*1 extending therethrough. Further, each bunk attachment member 2002 on a trailer can also include a hole extending therethrough. When the bracket hole 1006*a*1 in the bracket extension member 1006*a* is placed adjacent to and aligned with a corresponding hole in the bunk attachment member 2002 of a trailer, the bolt 1008 (see FIG. 7) can be inserted through both the hole in a bunk attachment member 2002 of the trailer and the hole 1006*a*1 through the bracket extension member 1006*a*. After a bolt 1008 is inserted through both the bracket extension member hole 1006*a*1 of the torque prevention bracket 1006 and the corresponding hole in a bunk attachment member 2002 of the trailer the corresponding nut 1008*a* (see FIG. 7) can be threaded onto the bolt 1008 to secure the torque prevention bracket 1006 to the bunk attachment member 2002 of the trailer. Then, based on the angle of a hull of a watercraft to be placed on the rollers 1004 of the roller bunks 1002, the nuts 1008*a* can be loosened to tilt the torque prevention brackets 1006 and roller bunks 1002 such that the roller bunks 1002 and rollers 1004 will be aligned with the angles of the hull of the watercraft. Accordingly, the roller bunk system 1000 is adjustable to accommodate the shape and angle of any hull of a watercraft.

At the first side "A" of each torque prevention bracket 1006 can be provided a pair of U-bolt holes 1006*b* configured to receive two respective ends of a U-bolt 1006*c* therethrough. Each U-bolt 1006*c* is configured to fit over the roller bunk 1002 such that the ends of the U-bolt 1006*c* can be inserted through the U-bolt holes 1006*b* on the respective torque prevention bracket 1006 to secure the roller bunk 1002 to the torque prevention bracket 1006. Once the two ends of the U-bolt 1006*c* are inserted through the respective U-bolt holes 1006*b* formed in the bracket 1006*a* corresponding U-bolt nut 1006*c*1 can be threaded on each of the two ends of the U-bolt 1006*c* to slidably attach the roller bunk 1002 to the torque prevention brackets 1006. A washer can be slid onto each U-bolt end prior to threading the nuts 1006*c*1 thereon to prevent the nuts 1006*c*1 from unthreading from the U-bolt 1006*c*. At this point the roller bunks 1002 are still adjustable with respect to the trailer since the roller bunks 1002 can be slid forward and backward between the U-bolt 1006*c* and torque prevention bracket 1006 combinations and with respect to the trailer. Once the roller bunks 1002 are positioned at the desired location on the trailer the nuts 1006*c*1 on the U-bolts 1006*c* can be tightened to secure the roller bunks 1002 in place with respect to the torque prevention brackets 1006 and the trailer. It is to be noted that the torque prevention brackets 1006 can remain slidably attached to the bunks 1002 prior to attaching the brackets 1006 to respective attachment members 2002 of a trailer, such that the roller bunks 1002 can be attached to a trailer and still remain slidable with respect to the torque prevention brackets 1006 in order to adjust the positioning of the bunks 1002 with respect to a center of balance of a trailer. For example, since a wheelbase on trailers are configured based on many different factors of a trailer, the bunks 1002 can be adjusted to correspond with the wheelbase of a trailer after the bunks 1002 are slidably attached to the trailer via the torque prevention brackets 1006. As pointed out above, once the U-bolt nuts 1006*c*1 are tightened onto the ends of the U-bolt 1006*c* of each torque prevention bracket 1006 the roller bunk 1002 will no longer be slidable within the torque prevention brackets 1006.

Referring back to FIG. 5A, a top view of the roller bunk system 1000 according to the example embodiment of FIG. 3 is illustrated. The position of the roller bunk system 1000 illustrated in FIG. 5A represents a position where the pair of roller bunks 1002 would be fixed with respect to each other, onto a trailer. With this configuration it is to be noted that the bracket extensions 1006*a* of each torque prevention bracket 1006 and the second half B of the torque prevention brackets 1006 will be disposed in an axial alignment A-A with the rollers 1004.

FIG. 5B illustrates a bottom view of the roller bunk system 1000, according to the example embodiment of FIG. 3, also in a position where the pair of roller bunks 1002 would be fixed with respect to each other, onto a trailer. As pointed out above, the bracket extensions 1006*a* of each torque prevention bracket 1006 and the second half B of the torque prevention brackets 1006 will be disposed in an axial alignment A-A with the rollers 1004. More specifically, while at least two torque prevention brackets 1006 will be attached to each roller bunk 1002 (each torque prevention bracket 1006 being disposed between two adjacent rollers 1004) the bracket extensions 1006*a* will be positioned in the same line A-A as the rollers 1004, while the bracket extensions 1006*a* extend downward to a position lower than the rollers 1004 so that the bracket extensions 1006*a* can be secured to a respective bunk attachment member 2002 of a trailer. With this configuration of the rollers 1004 and the bracket extensions 1006*a* being positioned along the same line A-A the weight of a watercraft placed on the rollers 1004 will create a downward force F (see FIG. 7), which will extend directly to the bracket extensions 1006*a*, and as a result, this same force F will extend directly onto the attachment members 2002 of a trailer. In other words, the force F of a watercraft will be applied directly on the rollers 1004, causing an equal and opposite force to be applied upward on the bracket extensions 1006*a* from the bunk attachment members 2002 of a trailer. As a result of these equal and opposite forces F no resulting torque will be applied to the bunks 1002.

Figure 7:
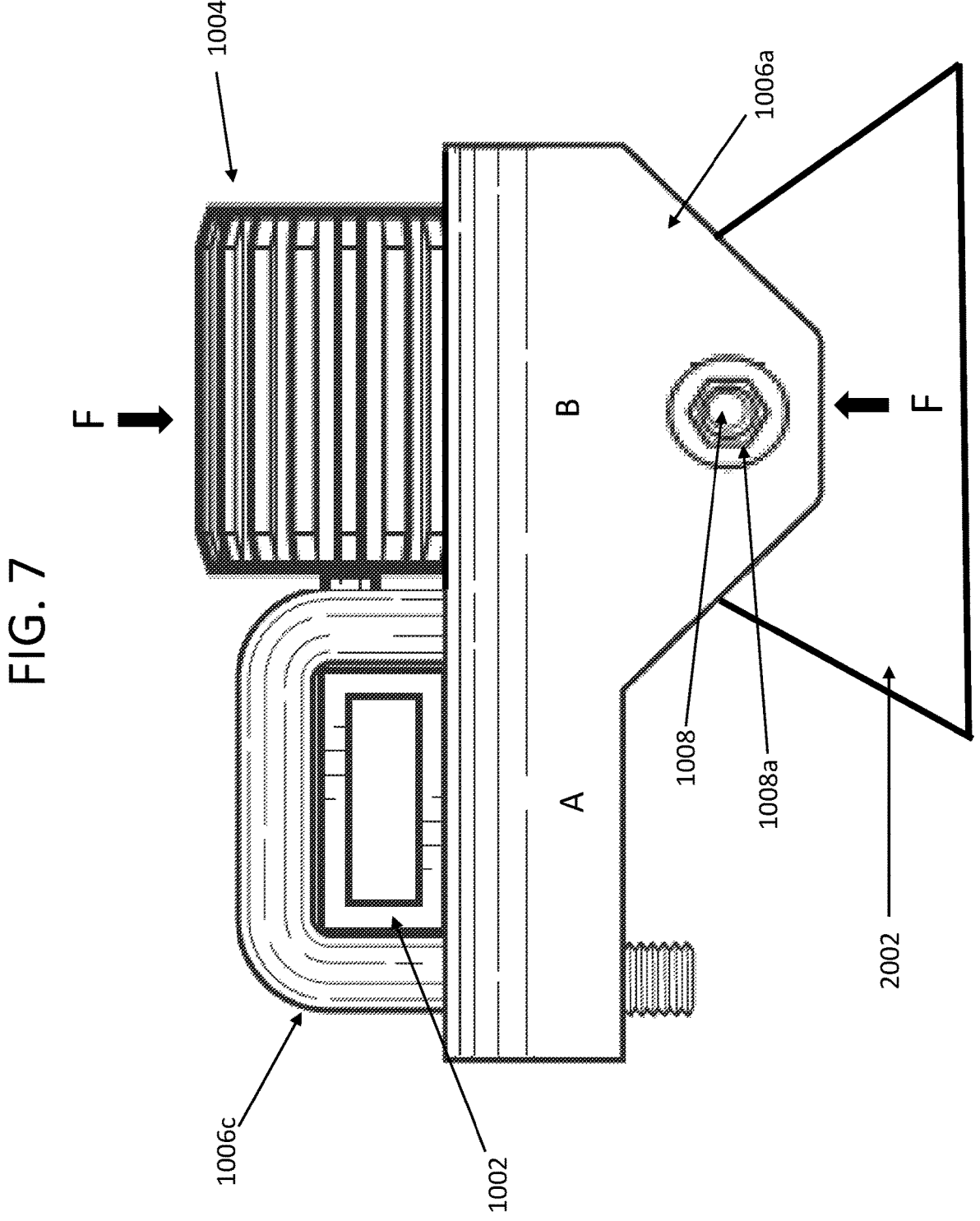
FIG. 7 illustrates the roller bunk system 1000 according to the example embodiment of FIG. 3 in a position fixed to an attachment member of a trailer.

FIG. 7 illustrates a position of one of the roller bunks 1002 when fixed to a bunk attachment member 2002 of a trailer. As illustrated, since a downward force F due to the weight of a watercraft will be applied directly on the rollers 1004, which are in vertical alignment A-A with the bracket extensions 1006*a* of each bracket 1006, no resulting torque will be applied to the roller bunks 1002. In other words, as a result of the downward force F caused by the weight of the watercraft and the equal upward counterforce applied by the trailer at the attachment member 2002 no torque is applied to the roller bunks 1002. Therefore, the pair of roller bunks 1002, when attached to a trailer via the brackets 1006, will be balanced on the trailer, resulting in little to no wear and tear on the roller bunk system 1000.

The design of the roller bunk system 1000 according to the example embodiments described herein enables adjustments in both back and forth directions with respect to a trailer in which the roller bunk system 1000 becomes attached to, and also enables a tilting direction in both inward and outward directions to accommodate different shapes of hulls of a watercraft. More specifically, the roller bunk system 1000 can be tilted inward such that the pair of bunks 1002 and corresponding rollers 1004 can tilt inward towards each other by loosening the bolts 1008 connecting the bracket extensions 1006a to the attachment members 2002, and then the bolts 1008 can be tightened to secure the brackets 1006 in place with respect to the corresponding attachment members 2002. Similarly, the roller bunk system 1000 can be tilted outward such that the pair of bunks 1002 and corresponding rollers 1004 can tilt upwards to create a flat bed-type base from a more flat hull of a watercraft by loosening the bolts 1008 connecting the bracket extensions 1006a to the attachment members 2002, and then the bolts 1008 can be tightened to secure the brackets 1006 in place with respect to the corresponding attachment members 2002. Thus, all types of watercrafts, including ones with shallow hulls, deep hulls, and longer and shorter hulls can be accommodated by the roller bunk system 1000 according the present inventive concept.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An adjustable roller bunk system for a watercraft trailer, comprising:

a pair of roller bunks each including a plurality of roller axles extending from one side thereof;

a roller rotatably disposed on each of the plurality of roller axles;

at least two torque prevention brackets slidably attached at a top portion thereof and at a first half thereof to each roller bunk such that a second half of each torque prevention bracket extends outward from the roller bunk in a same direction as the roller axles, each of the at least two torque prevention brackets including:

an attachment device to slidably attach the roller bunk to the top portion and first half thereof;

an extension member disposed at the second half thereof and extending from a bottom portion thereof, the extension member including a single hole extending through a middle portion to receive a bolt therethrough to adjustably attach to a trailer to align the rollers with various shaped watercraft hulls, and being in alignment with the plurality of corresponding rollers such that all weight applied to the rollers directly transfers to the second half of the torque prevention bracket and the extension member to prevent torque from being applied to the corresponding roller bunk; and a bolt extending through the hole in the extension member and configured to adjustably attach the extension member to an attachment member on a watercraft trailer.

2. The adjustable roller bunk system according to claim 1, wherein the attachment device of each torque prevention bracket is a U-bolt configured to fit over the respective roller bunk and bolts to the first half of the torque prevention bracket.

3. The adjustable roller bunk system according to claim 1, wherein the extension members of each torque prevention bracket are aligned along a same line as the plurality of roller axles extending from the one side of the corresponding roller bunk such that a force applied to the rollers of each roller bunk will cause an equal and opposite force on the extension members by the attachment members of the trailer in which the extension members are fixed thereto.

4. The adjustable roller bunk system according to claim 1, wherein the roller bunks and torque prevention brackets are formed of steel or aluminum.

5. The adjustable roller bunk system according to claim 1, wherein the roller bunks and torque prevention brackets are formed of titanium or galvanized steel.

6. A roller bunk apparatus configured to be attached to a watercraft trailer, comprising:

an elongated roller bunk including a plurality of roller axles extending from one side thereof;

a roller rotatably disposed on each of the plurality of roller axles;

at least two torque prevention brackets slidably attached at a top portion thereof and at a first half thereof to the roller bunk such that a second half of each torque prevention bracket extends outward from the roller bunk in a same direction as the plurality of roller axles, each of the at least two torque prevention brackets including:

an attachment device to slidably attach the roller bunk to the top portion and first half thereof; and an extension member disposed at the second half thereof and extending from a bottom portion thereof, the extension member including a single hole extending through a middle portion to adjustably attach to a watercraft trailer to align the rollers with various shaped watercraft hulls, the second half of the torque prevention bracket and corresponding extension member configured to be disposed in a same line as the rollers and in parallel with the corresponding elongated roller bunk such that weight applied to the rollers transfers directly to the second half of the torque prevention bracket and the extension member to prevent torque from being applied to the corresponding roller bunk.

7. The adjustable roller bunk apparatus according to claim 6, wherein the attachment device of each torque prevention bracket is a U-bolt configured to fit over the respective roller bunk and bolt to the first half of the torque prevention bracket.

8. The adjustable roller bunk apparatus according to claim 6, wherein the roller bunk and torque prevention brackets are formed of steel or aluminum.

9. The adjustable roller bunk apparatus according to claim 6, wherein the roller bunk and torque prevention brackets are formed of titanium or galvanized steel.

* * * * *